No. 763,716. PATENTED JUNE 28, 1904.
M. BRAY.
INDICATOR FOR LIQUID RECEPTACLES.
APPLICATION FILED APR. 25, 1904.
NO MODEL. 4 SHEETS—SHEET 1.
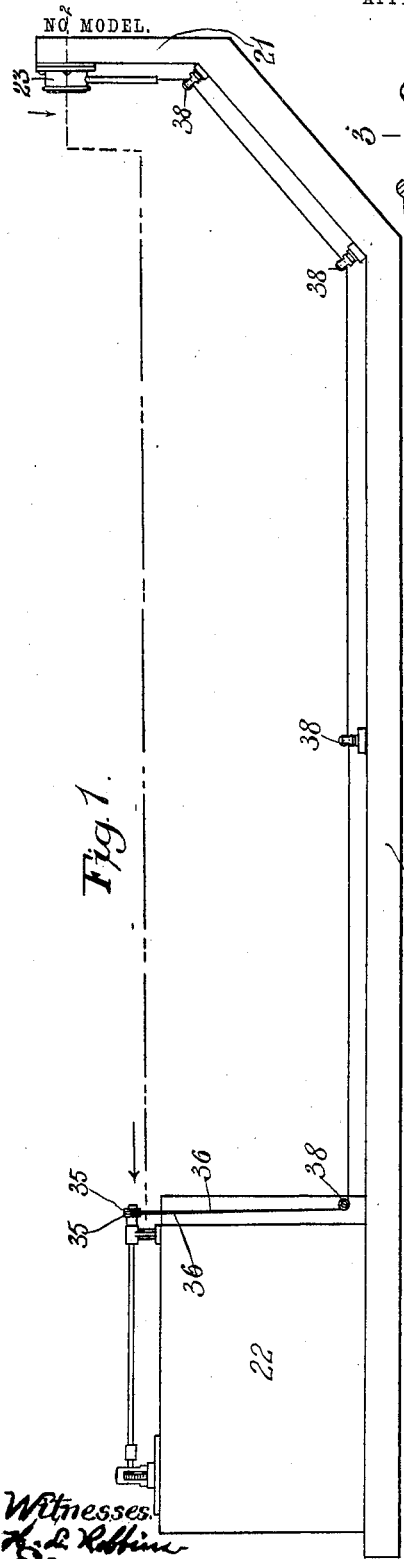
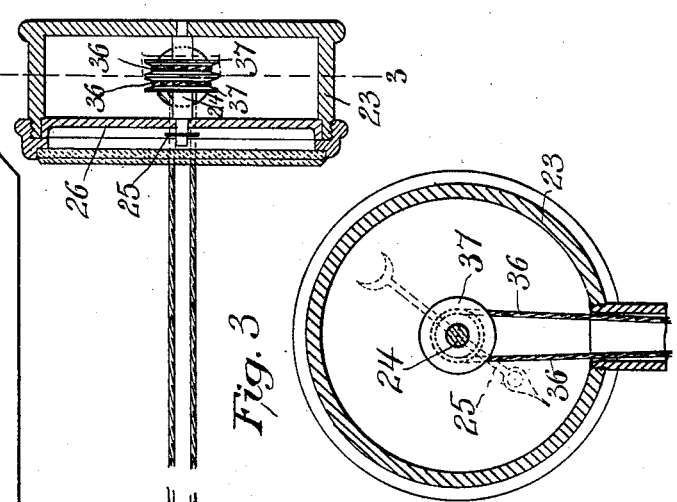
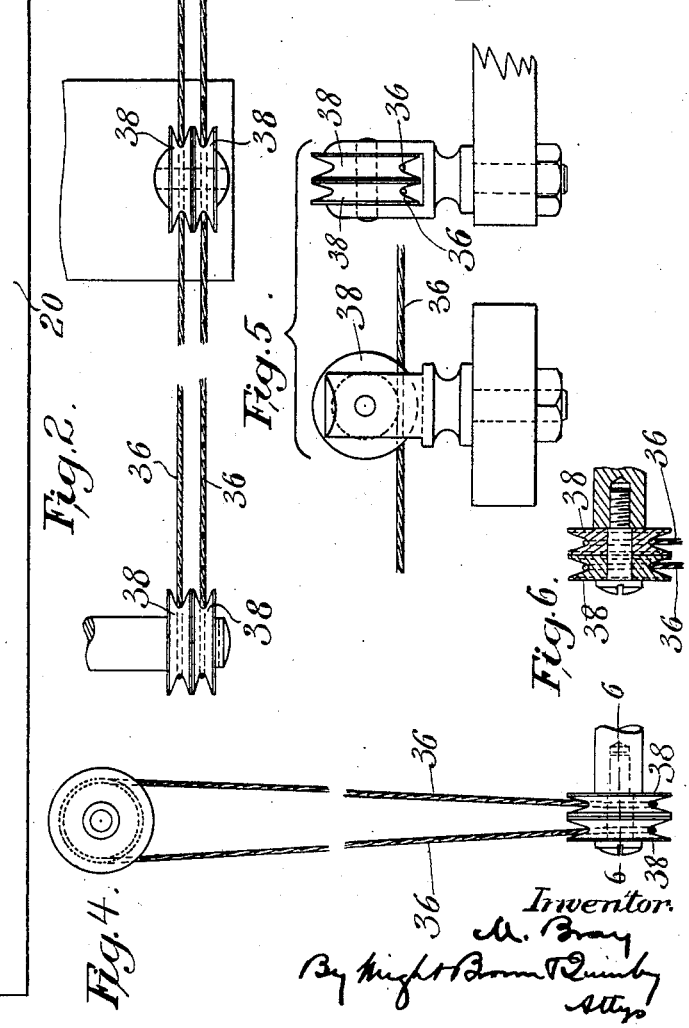
Witnesses:
Inventor
M. Bray
By Wright Brown & Quinby
Attys No. 763,716. PATENTED JUNE 28, 1904.
M. BRAY.
INDICATOR FOR LIQUID RECEPTACLES.
APPLICATION FILED APR. 25, 1904.
NO MODEL. 4 SHEETS—SHEET 2.
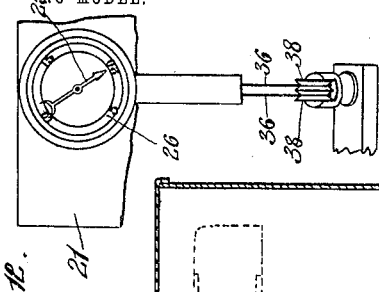
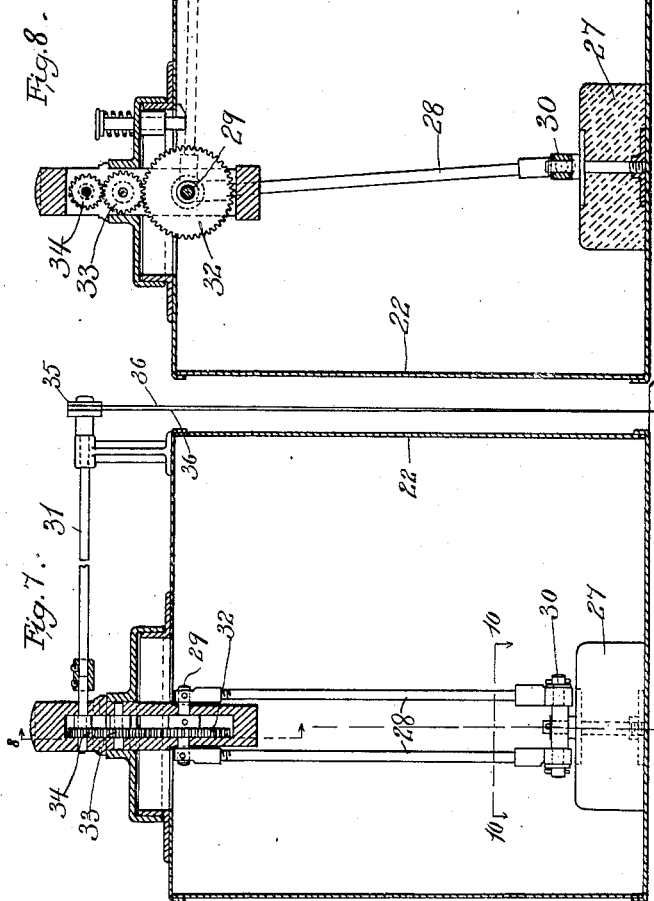
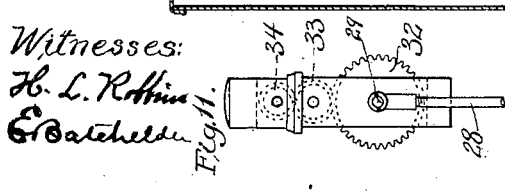
Witnesses:
H. L. Robbins
E. Batchelder
Inventor:
M. Bray
By Wright Brown Quimby
Attys No. 763,716. PATENTED JUNE 28, 1904.
M. BRAY.
INDICATOR FOR LIQUID RECEPTACLES.
APPLICATION FILED APR. 25, 1904.
NO MODEL. 4 SHEETS—SHEET 3.
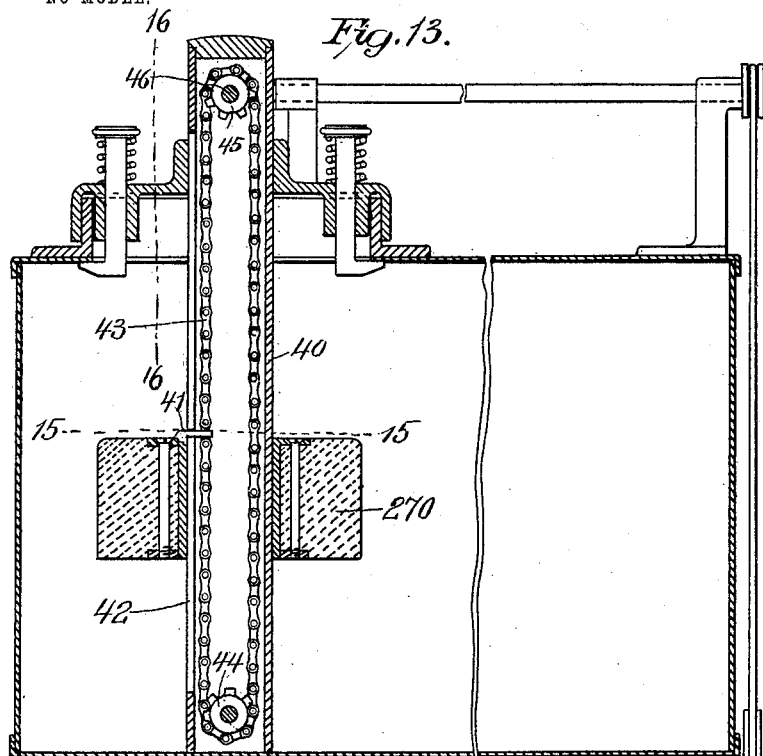
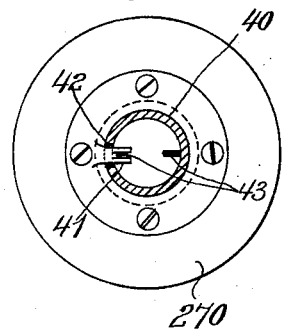
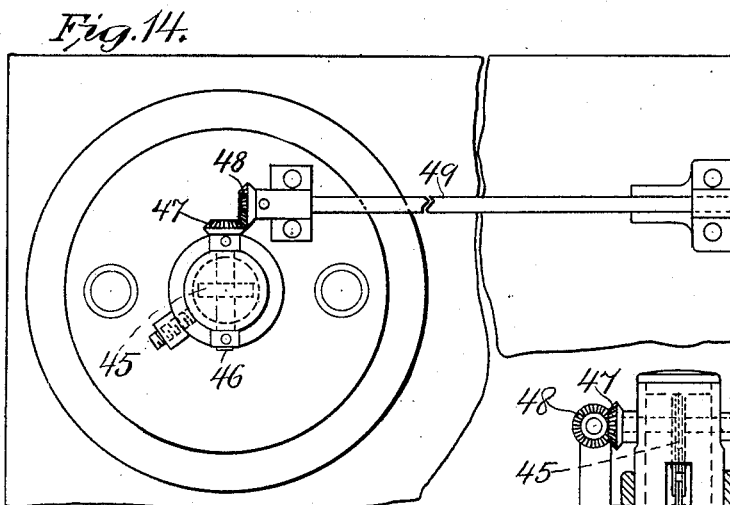
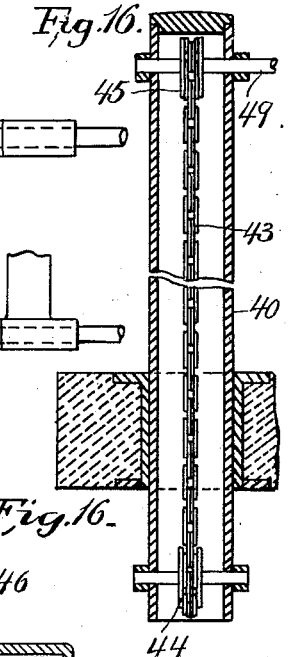
Witnesses.
A. C. Ratigan
E. Batchelder
Inventor.
M. Bray
By Wright Brown & Quimby
Attys No. 763,716. PATENTED JUNE 28, 1904.
M. BRAY.
INDICATOR FOR LIQUID RECEPTACLES.
APPLICATION FILED APR. 25, 1904.
NO MODEL. 4 SHEETS—SHEET 4.
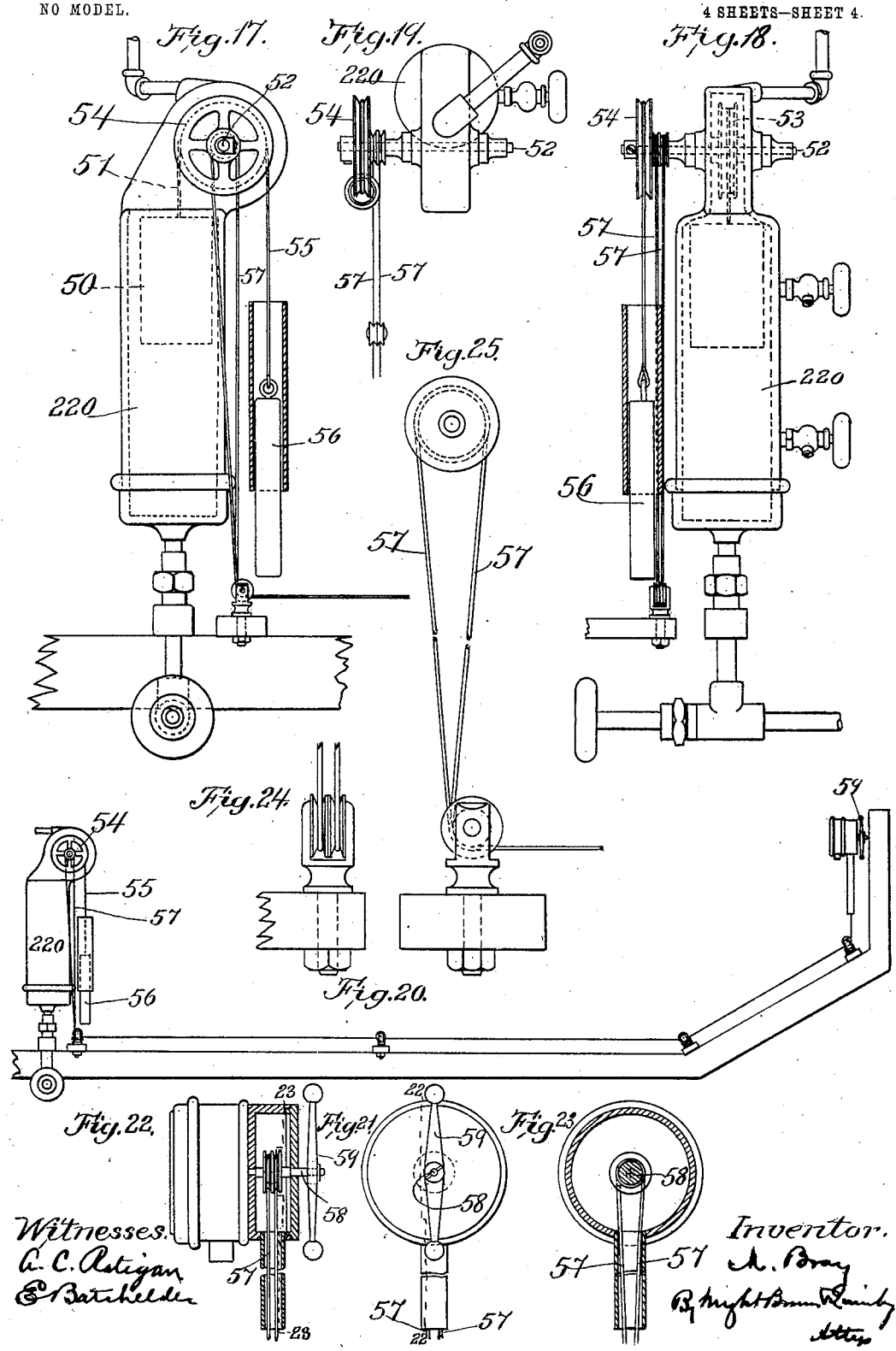

No. 763,716. Patented June 28, 1904.

UNITED STATES PATENT OFFICE.

MELLEN BRAY, OF NEWTON, MASSACHUSETTS.

INDICATOR FOR LIQUID-RECEPTACLES.

SPECIFICATION forming part of Letters Patent No. 763,716, dated June 28, 1904.

Application filed April 25, 1904. Serial No. 204,732. (No model.)

*To all whom it may concern:*

Be it known that I, MELLEN BRAY, of Newton, in the county of Middlesex and State of Massachusetts, have invented certain new and useful Improvements in Indicators for Liquid-Receptacles, of which the following is a specification.

This invention relates to indicators for showing the height of a body of liquid in a receptacle, such as the water-tank or water-gage of a motor-vehicle, and has for its object to provide an indicating mechanism the acting part or indicator of which may be located at any desired distance from the liquid-receptacle and in such position that it may be conveniently observed by an occupant of the vehicle.

In the preferred embodiment of my invention the indicator proper is located on the dashboard of the vehicle in front of the seat, the said indicator being connected with a float in the tank by flexible connecting means conforming approximately to the floor or body of the vehicle.

The invention consists in the improvements which I will now proceed to describe and claim.

Of the accompanying drawings, forming a part of this specification, Figure 1 represents an edge view of the floor or bottom and dashboard of a motor-vehicle provided with a liquid tank or receptacle and an indicating mechanism embodying my invention. Fig. 2 represents a section on line 2 2 of Fig. 1 and a plan view of parts of the connecting mechanism below said line. Fig. 3 represents a section on line 3 3 of Fig. 2. Figs. 4 and 5 represent fragmentary views showing details of the connecting mechanism represented in Figs. 1 and 2. Fig. 6 represents a section on line 6 6 of Fig. 4. Fig. 7 represents a longitudinal section of the liquid-receptacle and an elevation showing the chief parts of the indicator-operating mechanism. Fig. 8 represents a section on line 8 8 of Fig. 7. Fig. 9 represents a top plan view of the liquid-receptacle and portions of the indicating mechanism. Fig. 10 represents a section on line 10 10 of Fig. 7. Figs. 11 and 12 represent elevations of portions of the indicating mechanism. Fig. 13 represents a sectional view similar to Fig. 7, illustrating a modification. Fig. 14 represents a top view of the construction represented in Fig. 13. Fig. 15 represents a section on line 15 15 of Fig. 13. Fig. 16 represents a section on line 16 16 of Fig. 13 looking toward the right. Fig. 16ª represents another modification. Figs. 17 and 18 represent side elevations showing my invention embodied in a water-gage indicator for boilers. Fig. 19 represents a top view of the same. Fig. 20 represents an elevation showing the apparatus represented by Figs. 17, 18, and 19 applied to the body of a motor-vehicle. Fig. 21 is an elevation of the indicator shown in Fig. 20. Fig. 22 is a section on line 22 22 of Fig. 21. Fig. 23 is a section on line 23 23 of Fig. 22. Figs. 24 and 25 are fragmentary views of details.

The same reference characters indicate the same parts in all the figures.

In the drawings, 20 represents the floor or bottom of the body of a motor-vehicle, and 21 represents the dashboard thereof.

22 represents a liquid-receptacle mounted on the rear portion of the body. Said receptacle may be the water-tank and may be located under or behind the seat of the vehicle.

23 represents an indicator-casing, which in this embodiment of my invention is affixed to the dashboard 21 and contains a rotary shaft 24, journaled in bearings in the casing, said shaft being provided with a pointer 25, which coöperates with a graduated scale or dial-plate 26 in the casing in a common and well-known manner.

Motion is imparted to the pointer from a float located within the receptacle 22 through suitable connections between the said float and the shaft 24, the float being adapted to rise and fall with the liquid in the receptacle and suitably engaged with said connecting mechanism, so that when the float is at its maximum height the pointer will coincide with the highest number on the dial, and as the float falls the position of the pointer will be correspondingly changed.

In the embodiment of my invention shown in Figs. 1, 7, 8, 9, 10, and 11 the float 27, which may be made of cork or other buoyant material, is jointed to one end of a swinging lever 28, the opposite end of which is fixed to a primary rock-shaft 29, journaled in bearings in the upper portion of the receptacle. The lever 28 is preferably composed of two parallel rods, as shown in Fig. 7, the lower ends of said rods being jointed to a transverse stud 30, which is suitably secured to the float. The upper ends of the rods 28 are pinned or otherwise rigidly secured to the rock-shaft 29.

31 represents a secondary rock-shaft, which is journaled in bearings above the receptacle 22. The two rock-shafts 29 and 31 are connected by a train of gears 32, 33, and 34, arranged to impart rotary motion from one rock-shaft to the other. The secondary rock-shaft 31 is provided with two pulleys 35, which are connected by two cords 36 36 with two pulleys 37 37, affixed to the shaft 24 in the indicator-casing. The cords 36 are guided by suitable guide-pulleys 38, preferably arranged, as shown in Fig. 1, to cause the course of the belt to conform approximately to the contour of the portion of the vehicle-body along which it extends, the said guiding-pulleys being arranged in pairs, as shown in Figs. 2, 4, 5, and 6.

When the receptacle 22 is filled, the float 27 will occupy the position shown by dotted lines in Fig. 8, the lever 28 being substantially horizontal. The arrangement is such that when the float is in the position last described the pointer 25 will coincide with the highest number on the indicator-dial. When the liquid subsides in the receptacle, the float descends, causing a rotary movement of the rock-shaft 29, the latter in turn imparting motion to the secondary rock-shaft 31, and through the cords 36 to the indicator-shaft, thus causing the pointer 25 to move in conformity to the downward movement of the float. When the tank is empty, the float will occupy the position shown by full lines in Fig. 8, and the pointer will coincide with the zero-mark on the dial.

In Figs. 13, 14, 15, and 16 I show a modification in which the float 270 has a vertical instead of a swinging movement and is guided by a fixed vertical tube 40, the float being of annular form and surrounding the said tube. The float is provided with a finger 41, which projects through a slot 42 in the tube 40 and engages a sprocket-chain 43, which is mounted on sprocket-wheels 44 and 45 within the tube 40. A vertical movement of the float 270 will cause a corresponding movement of the sprocket-chain 43, the latter rotating the wheels 44 and 45. The upper sprocket-wheel 45 is affixed to a rock-shaft 46, which is journaled in the upper portion of the tube 40 and provided with a bevel-gear 47, meshing with a corresponding bevel-gear 48 on a secondary rock-shaft 49. The last-mentioned rock-shaft may be connected with the indicator-shaft 24 by means similar to those above described for connecting the rock-shaft 31 with the said indicator-shaft.

If desired, the secondary rock-shaft 49 may be extended into the tube 40, the upper sprocket-wheel 45 being attached directly to the shaft 49, as shown in Fig. 16ª.

It will be seen from the foregoing that my invention provides a liquid-receptacle, an indicator relatively remote from the receptacle, and mechanism controlled by the liquid in the receptacle for controlling the indicator to show at any time the height of the liquid in the receptacle, the position of the indicator being such that it can be conveniently observed at any time.

It is obvious that various other changes in details of the indicator-operating mechanism may be made without departing from the spirit of my invention.

In Figs. 17 to 25, inclusive, I show the invention embodied in a water-gage for boilers of motor-vehicles. In said figures, 220 represents the liquid-receptacle, which is connected at its upper and lower ends by suitable piping with the steam and water spaces of the boiler, the arrangement of the receptacle and its connections being such that the water will stand at the same level in the receptacle as in the boiler. Within the receptacle is a float 40, which is connected by a strap or flexible connection 51 with a pulley 53, attached to a rock-shaft 52. 54 represents another pulley affixed to the rock-shaft, and from this pulley is suspended by a cord 55 a counterbalancing-weight 56, which is located outside the receptacle 220. When the water descends in the receptacle, the float 50 will fall and impart motion in one direction to the rock-shaft, the weight 56 rising. When the water rises in the receptacle, the weight 56 will fall and impart motion in the opposite direction to the rock-shaft. The rock-shaft is connected by cords 57 57 with the rotary indicator-shaft 58, the latter having a cross-arm 59, the ends of which are preferably provided with enlargements, as shown in Figs. 21 and 22. The cords 57 are engaged with pulleys on the rock-shaft 52 and indicator-shaft 58 and are guided by suitable guiding-pulleys, as shown in Fig. 20. The indicator-arm 59 is preferably located outside the casing in which the shaft 58 is journaled, so that the said arm may be manipulated by the operator in case he desires to impart motion through the cords 57 to the rock-shaft 52.

It will be observed that the rock-shaft, which is belted to the indicator, is independent of the float, so that it is capable of being completely rotated by a movement of the float from one end of its path to the other. Provision is therefore made for giving the indicator a complete revolution, so that it is adapted to coöperate with a circular dial, the graduations of which may be easily read by a chauffeur from his seat, the indicator being located on the dashboard or at a relatively remote point at the front portion of the body of the vehicle.

I claim—

1. In combination, a liquid-receptacle, a float adapted to rise and fall with the liquid therein, a shaft independent of the float, journaled in bearings adjacent thereto, mechanism actuated by movements of the float for imparting rotary motion to the shaft, a rotary indicator relatively remote from the receptacle, and means for imparting rotary motion from the shaft to the indicator.

2. In combination, a liquid-receptacle, a float adapted to rise and fall with the liquid therein, a shaft journaled in bearings adjacent to the float, connections between the float and shaft for imparting rotary motion to the shaft when the float rises or falls, an indicator relatively remote from the receptacle, a belt engaged with pulleys on the shaft and indicator, and means for guiding said belt.

3. In combination, a liquid-receptacle, a primary rock-shaft, a float, connections between the float and primary rock-shaft for turning the latter, a secondary rock-shaft, connections between the two rock-shafts, an indicator remote from the receptacle, a belt engaged with pulleys on the secondary shaft and indicator, and means for guiding the belt.

4. In combination, a liquid-receptacle, a primary rock-shaft, an arm affixed to said rock-shaft, a float engaged with the outer end of said arm, a secondary rock-shaft, gearing connecting the two rock-shafts, a rotary indicator remote from the receptacle, a belt engaged with pulleys on the secondary rock-shaft and the indicator, and means for guiding said belt.

In testimony whereof I have affixed my signature in presence of two witnesses.

MELLEN BRAY.

Witnesses:
F. E. LONG,
F. L. RICHARDSON.